United States Patent
Fu et al.

(10) Patent No.: US 11,195,552 B1
(45) Date of Patent: Dec. 7, 2021

(54) PLAYBACK CONTROL OF A VIDEO BASED ON COMPETENCY ASSESSMENT

(71) Applicant: International Business Machines Corporation, Armonk, NY (US)

(72) Inventors: Lu Fu, Ningbo (CN); Yin Xia, Beijing (CN); You You, Ningbo (CN); Bin Xu, Ningbo (CN); Jia Li Chen, Zhejiang Province (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/204,060

(22) Filed: Mar. 17, 2021

(51) Int. Cl.
| | |
|---|---|
| *G11B 27/11* | (2006.01) |
| *G11B 27/34* | (2006.01) |
| *G11B 27/00* | (2006.01) |
| *G09B 5/06* | (2006.01) |

(52) U.S. Cl.
CPC ........... *G11B 27/005* (2013.01); *G09B 5/065* (2013.01); *G11B 27/11* (2013.01); *G11B 27/34* (2013.01)

(58) Field of Classification Search
CPC ....... G11B 27/005; G11B 27/11; G11B 27/34; G09B 5/065
See application file for complete search history.

(56) References Cited

U.S. PATENT DOCUMENTS

| | | | |
|---|---|---|---|
| 6,317,795 B1 * | 11/2001 | Malkin | H04N 7/17318 709/246 |
| 10,811,055 B1 | 10/2020 | Kimber | |
| 2018/0288481 A1 * | 10/2018 | Goyal | G09B 5/065 |
| 2019/0056848 A1 * | 2/2019 | DiVerdi | G09G 5/12 |
| 2019/0268632 A1 | 8/2019 | Foerster | |
| 2020/0272222 A1 | 8/2020 | Goela | |

FOREIGN PATENT DOCUMENTS

| | | |
|---|---|---|
| CN | 107396170 A | 11/2017 |
| CN | 107403631 A | 11/2017 |
| KR | 20150080237 A | 7/2015 |

* cited by examiner

*Primary Examiner* — Thai Q Tran
*Assistant Examiner* — Jose M Mesa
(74) *Attorney, Agent, or Firm* — Stephanie L. Carusillo

(57) ABSTRACT

Methods, apparatus, computer program products for pausing playback of a video based on competency assessment of a user are provided. In response to receiving a request to play a video from a user, a processor obtains corresponding competency values for the user, wherein each competency values indicate a competency assessment of the user imitating a content of the video. A processor determines one or more nodes from respective split nodes of adjacent segments in the video as pausing nodes based on the competency values and correlation of the adjacent segments, wherein the split nodes and the correlation of the adjacent segments are determined based on the content of the video. A processor pauses a playback of the video based on the pausing nodes during the playback of the video for the user.

20 Claims, 10 Drawing Sheets

PLAYBACK CONTROL OF A VIDEO BASED ON COMPETENCY ASSESSMENT

BACKGROUND

The present invention relates to computer techniques and more particularly to controlling playback of a video based on competency assessment of a user.

As resources of a network become more abundant, a user may find a variety of video learning resources on the network to perform various activities by playing teaching videos. For example, a user may learn to cook by watching cooking videos, learn to exercise by watching fitness videos, learn to sing by listening to music videos, and so on. A user may imitate actions and/or sounds of the activities played in teaching videos to complete a learning process.

SUMMARY

Embodiments of the present invention disclose computer-implemented methods, systems, and computer program products. According to some embodiments of the present invention, in response to receiving a request to play a video from a user, a processor obtains corresponding competency values for the user, wherein the competency values indicate a competency assessment of the user imitating a content of the video. A processor determines one or more nodes from respective split nodes of adjacent segments in the video as pausing nodes based on the competency values and correlation of the adjacent segments, wherein the split nodes and the correlation of adjacent segments are determined based on the content of the video. A processor pauses a playback of the video based on the determined pausing nodes during the playback of the video for the user.

The above summary is not intended to describe each illustrated embodiment or every implementation of the present invention.

BRIEF DESCRIPTION OF THE DRAWINGS

The drawings included in the present application are incorporated into, and form part of, the specification. They illustrate embodiments of the present invention and, along with the description, serve to explain the principles of the invention. The drawings are only illustrative of certain embodiments and do not limit the invention. Through the more detailed description of some embodiments of the present invention in the accompanying drawings, the above and other objects, features and advantages of the present invention will become more apparent, wherein the same reference generally refers to the same components in the embodiments of the present invention.

Figure 1:
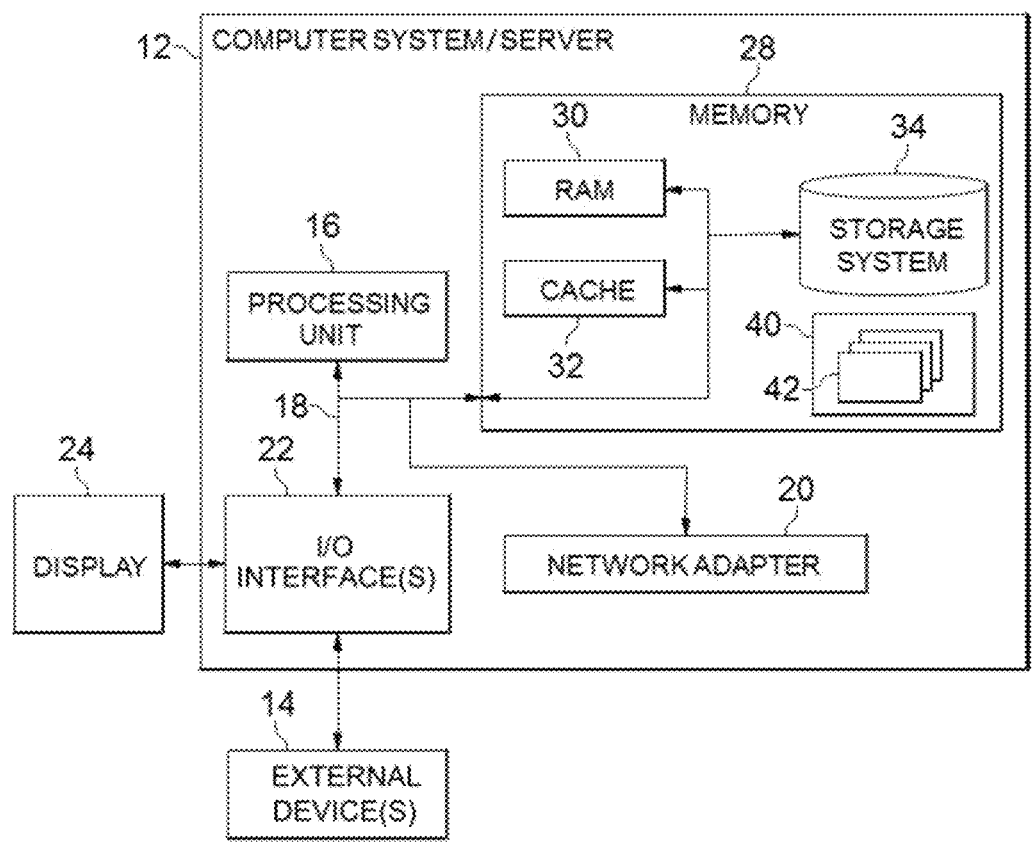
FIG. 1 depicts a cloud computing node according to some embodiments of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly level out and rapidly released to quickly level in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown, according to some embodiments of the present invention. Cloud computing node 10 is only one example of a suitable cloud computing node and is not intended to suggest any limitation as to the scope of use or functionality of embodiments of the invention described herein. Regardless, cloud computing node 10 is capable of implementing and/or performing any of the functionality set forth herein.

In cloud computing node 10, there is a computer system/server 12, which can be a portable electronic device such as a communication device, and/or numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor bus or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product 40 having a set (e.g., at least one) of program modules 42 that are configured to carry out the functions of embodiments of the invention.

Program product 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, and a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
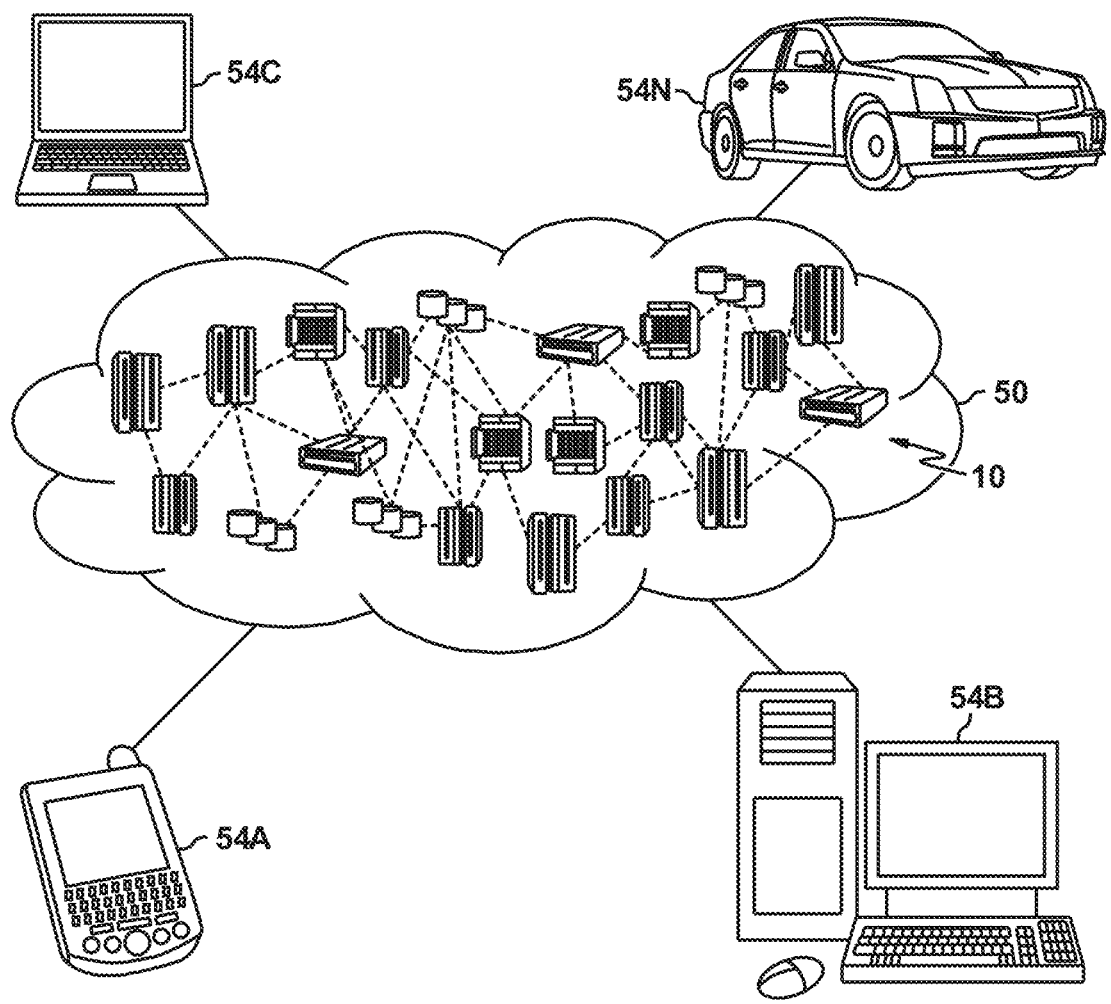
FIG. 2 depicts a cloud computing environment according to some embodiments of the present invention.

Referring now to FIG. 2, illustrative cloud computing environment 50 is depicted, according to some embodiments of the present invention. As shown, cloud computing environment 50 includes one or more cloud computing nodes 10 with which local computing devices used by cloud consumers, such as, for example, personal digital assistant (PDA) or cellular telephone 54A, desktop computer MB, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
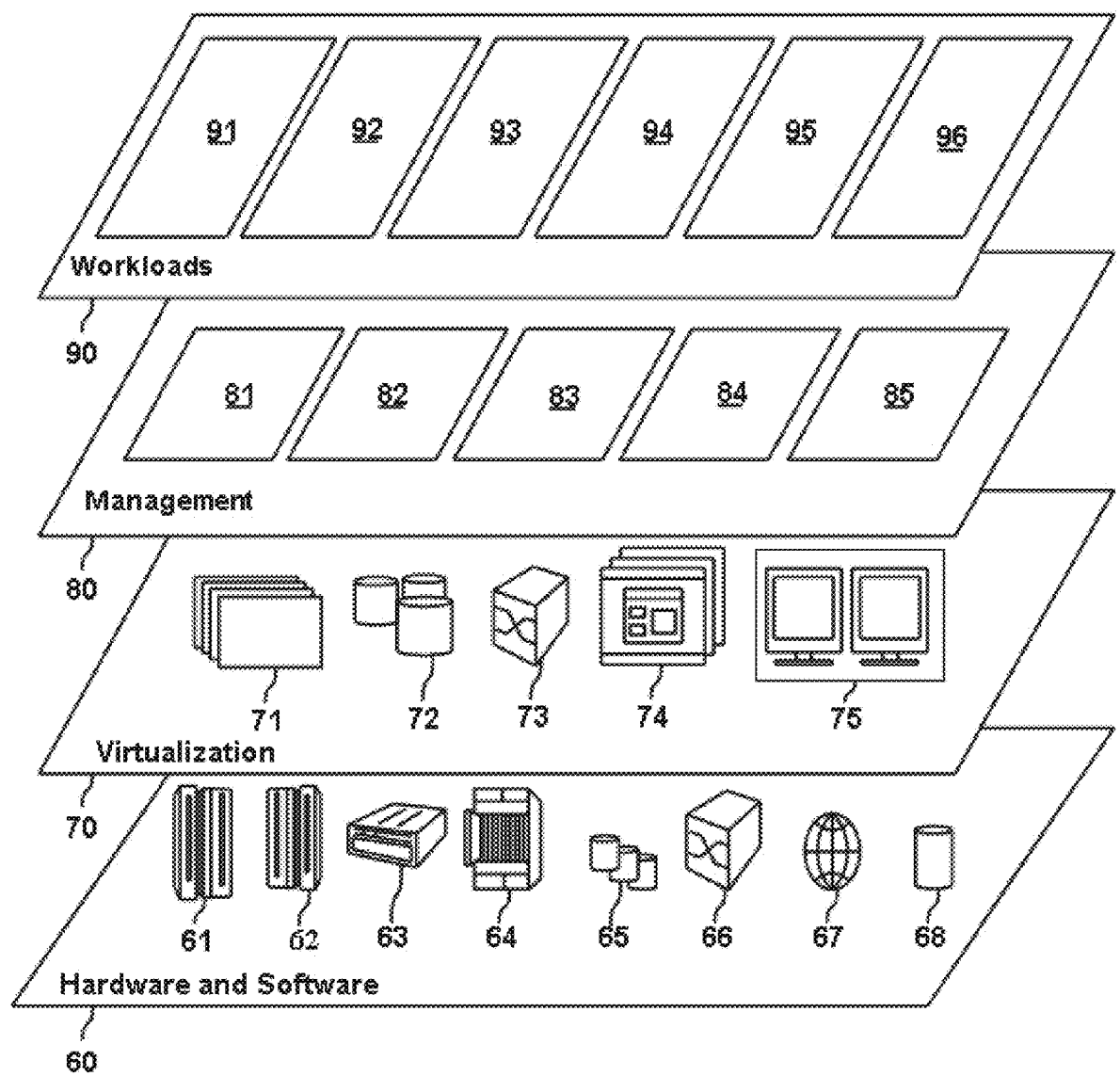
FIG. 3 depicts abstraction model layers according to some embodiments of the present invention.

Referring now to FIG. 3, a set of functional abstraction layers provided by cloud computing environment 50 (FIG. 2) is shown, according to some embodiments of the present invention. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and video playback control 96. The functionalities of video playback control 96 will be described in the following embodiments of the present invention.

As mentioned above, a user may imitate the actions and/or sounds of the activities played in a teaching video to complete a learning process. Various activities may be played in a video. The activities may include not only physical activities, such as yoga, dancing, and so on, but also other training activities, such as music, math, language arts, and so on. The actions and/or sounds of the activities, collectively referred to as 'content' herein, may be the object that the user intends to imitate. During the learning process, the user may want to pause the playback of the video, such as in the scenario when the user is not be able to keep up with the pace of the video or the user wants to imitate the content of the video once again, and so on. During the pause, the user may have a review or a replay of the content. Under this situation, the user may have to pause the video from time to time manually. On the other hand, the pausing points in the video may be variant for different users. It is desired to provide automatic personalized pausing points/nodes generation to the user during the course of the user imitating the content played in a video for a learning process.

Embodiments of the present invention provide a solution for automatic playback control of a video for a user based on a competency assessment of the user (represented as competency values) during the user imitating content played in the video. In this solution, the content of the video is pre-segmented into a plurality of segments. A split frame or node (hereinafter referred to as 'split node'), which is the frame or node splits adjacent segments in the video, may be a candidate of a pausing node, referred to as a preparatory segmentation node herein. Based on the competency assessment of the user and correlation of adjacent segments (represented as correlation coefficients) in the video during the actual learning, one or more nodes from preparatory segmentation nodes will be determined as pausing nodes. The video may be automatically paused at the determined pausing nodes during the course of the user imitating the content played in the video. Further, the competency value for the user may be dynamically updated according to real-time tracking of an imitation status of the user, and the pausing nodes in the video may be adjusted for the user in a next learning process based on the updated competency value. Thus, the present solution provides personalized pausing nodes generation of the video for the user based on the content of the video and competency of the user. This solution may be implemented by a video playback control module, for example, the example video playback control module depicted in FIG. 4.

Figure 4:
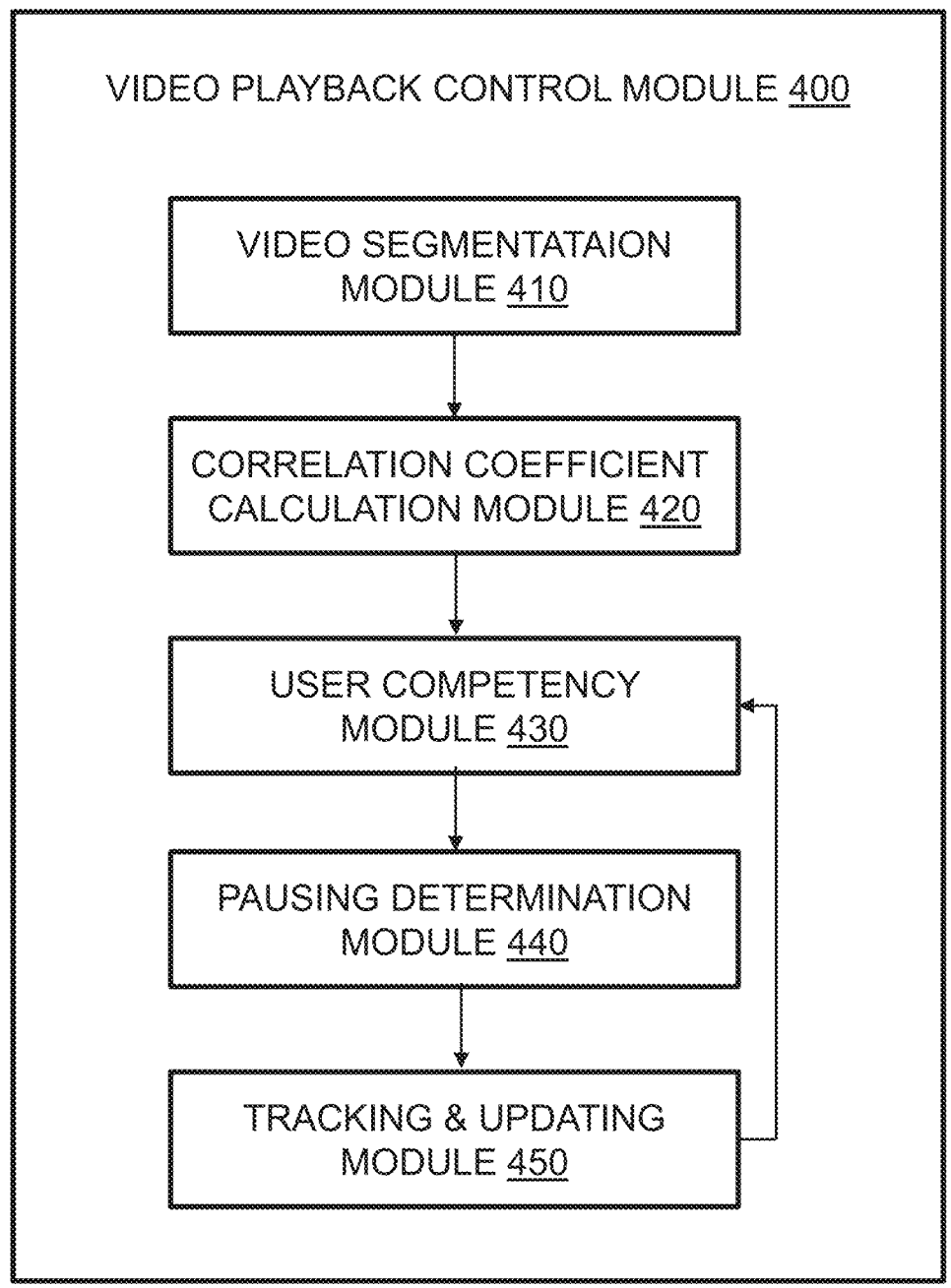
FIG. 4 depicts an example video playback control module according to some embodiments of the present invention.

With reference now to FIG. 4, an example video playback control module 400 according to embodiments of the present invention is depicted. The video playback control module 400 may be configured in a video manipulating application. The video playback control module 400 may be implemented in software, hardware, firmware, and/or any combination thereof. It should be noted that the video manipulating application is a program or process to implement or provide a function of playing a video. The user of the video manipulating application may call the video playback control module by selecting a pausing mode. The pausing mode proposed herein may be provided by the application along with a normal mode or by replacing the normal mode.

As illustrated in FIG. 4, the video playback control module 400 may include a video segmentation module 410, a correlation coefficient calculation module 420, a user competency module 430, a pausing determination module 440, and a tracking & updating module 450. The video playback control module 400 may also include a storage module (not shown). It would be appreciated that the video playback control module 400 is merely provided as a specific example, and the number of modules depicted in the FIG. 4 is merely shown for the purpose of illustration and in other examples, a different number of modules may work together to provide a similar function or intention.

The video segmentation module 410 may be configured to identify one or more preparatory segmentation nodes splitting adjacent segments in the video. The correlation coefficient calculation module 420 may be configured to calculate respective correlation coefficients of adjacent segments in the video. The user competency module 430 may be configured to obtain one or more competency values for the user. The one or more competency values indicate a competency assessment of the user and may be determined by calculating a degree of completion for the content of the user and/or a degree of similarity between the content played in the video and the corresponding content performed by the user. The pausing determination module 440 may be configured to determine one or more pausing nodes from the preparatory segmentation nodes based on the correlation coefficients of adjacent segments during the playback of the video and the competency values. The tracking & updating module 450 may be configured to receive the completion status of the user for the content played in the video, and update competency values for the user based on the received completion status. The storage module (not shown) may be configured to store the information about the segments, the preparatory segmentation nodes, etc. The above modules will be discussed in detail in the following in combination with FIGS. 5-10.

According to embodiments of the present invention, the video segmentation module 410 may identify the one or more preparatory segmentation nodes by determining a plurality of segments for the video based on a content recognition of the video. According to some embodiments of the invention, the content recognition for the video may be carried out by identifying a plurality of subjects for the content, and then the video may be divided into a plurality of segments corresponding to the plurality of subjects. It should be pointed out that the content recognition for the video may not be limited to identifying the subject. The content recognition may be carried out based on other standards, such as a collection of actions or a collection of English words, and so on. Herein only the content recognition by identifying the subjects is discussed.

According to embodiments of the present invention, the subjects discussed here may refer to a classification of content in the video. For example, if the video is a yoga learning video, a subject may refer to a group of yoga movements that belong to a section of a whole yoga training process. According to some embodiments of the invention, each of the subjects is associated with a level of subject granularity. Subject granularities discussed here may refer to the level of a classification of content in the video. For example, for the yoga learning video, a subject granularity of level one may refer to a first level classification of the yoga movements that corresponds to major sections in a series of yoga movements, and a subject granularity of level two may refer to a second level classification below the first level classification of the yoga movements that corresponds to a decomposition of yoga movements in a major section. The number of levels for the subject granularity may be determined depending on actual needs. Correspondingly, the video may be divided into the plurality of segments associated with different levels of subject granularity based on actual needs. For example, the content of the video may first be divided into segments of coarse granularity. Each segment of coarse granularity may further be divided into one or more segments of a smaller granularity, which may be defined as segments of medium granularity. Each segments of medium granularity may further be divided into one or more segments of even smaller granularity, which may be defined as segments of minimum granularity. In such way, the content of the video may be divided into three layers. Each layer corresponds to one level of granularity. It should be pointed out that the segments may be divided into different number of layers, for example one layer, two layers, four layers, and so on according to actual needs or may be divided in other manner and should not adversely limit the scope of the invention. Also, here subjects refer to the basis of content recognition, which can be any types of features. The respective split nodes of adjacent segments with a same level of subject granularity may be determined as the preparatory segmentation nodes. In the following, the determination of the preparatory segmentation nodes and correlation coefficients of the adjacent segments will be described in detail with reference to FIG. 5.

Figure 5:
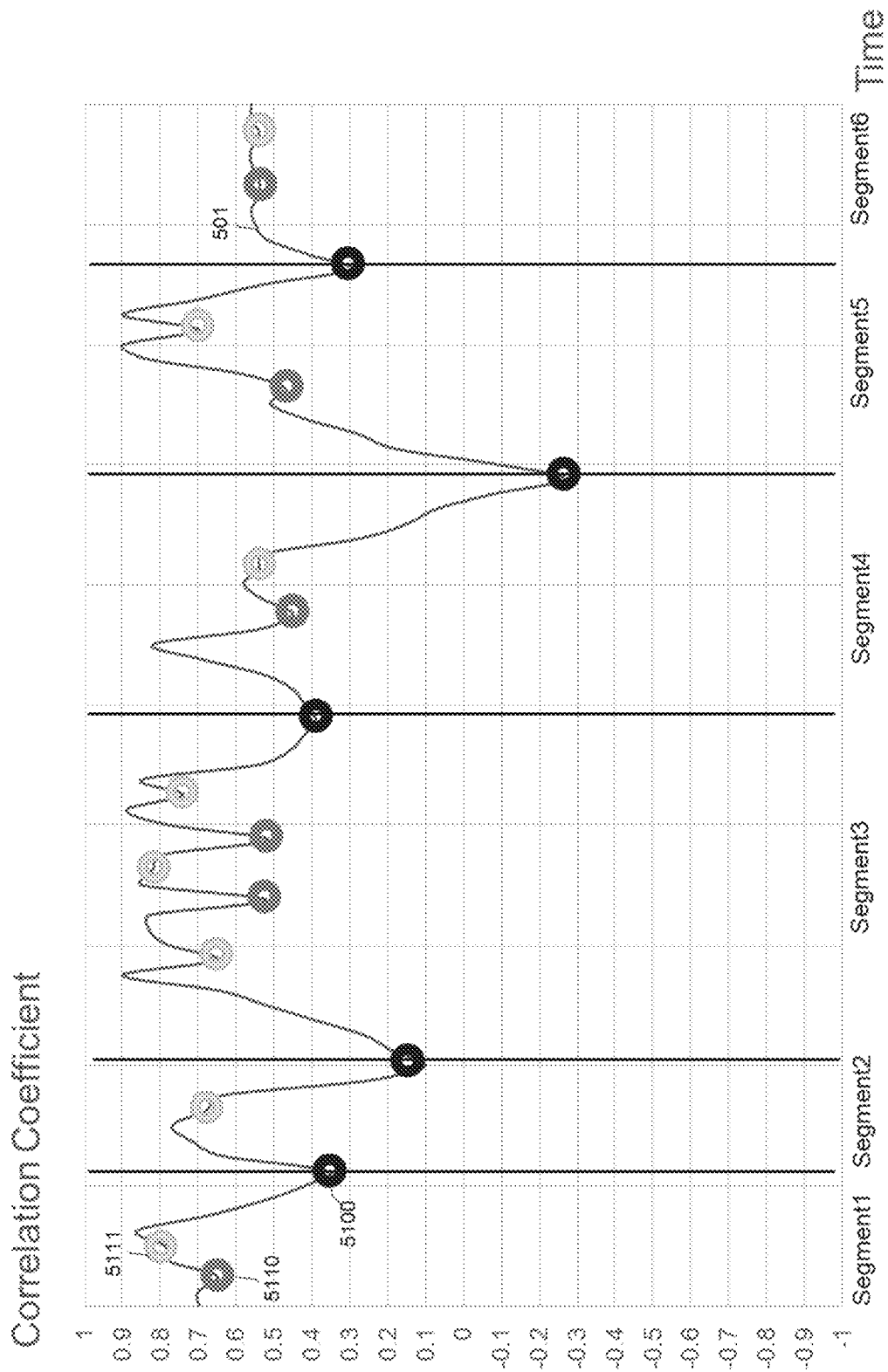
FIG. 5 depicts an example of a split nodes and correlation graph of adjacent segments of a video according to some embodiments of the present invention.

With reference now to FIG. 5, an example of split node and correlation coefficient graph of adjacent segments for a video according to embodiments of the present invention is depicted. According to embodiments of the present invention, taking a yoga learning video as a specific example for the purpose of illustration, without suggesting any limitations to the scope of the present invention, the preparatory segmentation nodes of coarse granularity may first be identified for the whole video. According to some embodiments of the invention, the coarse granularity may correspond to the first level of subject granularity, which may refer to a group of yoga movements that belong to a section of a whole yoga training process. For example, the following subjects (respective yoga movements in major sections) "up dog pose", "down dog pose", "magic chair pose", "moon worship pose", "tree pose", and "upside down pose" may first be identified. Then, the content of the video may be divided into corresponding segments based on the identified subjects. For example, the "up dog pose", "down dog pose", "magic chair pose", "moon worship pose", "tree pose", and "upside down pose" may be identified as segment1, segment2, segment3, segment4, segment5, and segment6, respectively. Segment1, segment2, segment3, segment4, segment5, and segment6 are shown in FIG. 5 as time series. The split nodes of adjacent segments may be determined as preparatory segmentation nodes of coarse granularity for the video. The preparatory segmentation nodes of coarse granularity correspond to the first level of subject granularity are marked as black circles in FIG. 5, such as 5100. It should be noted that the content in the video that need not be followed or learned may be ignored, such as advertisements, transitions, break time, etc.

Similarly, the video segmentation module 410 may further divide each of the segments (segment1 to segment6) into a plurality of smaller segments that correspond to a lower level of subject granularity. As discussed in the above, a second level of subject granularity for a yoga learning video may refer to a decomposition of yoga movements in a major section. For example, each subject (a yoga movement in a major section) of the first level subject granularity can be decomposed into multiple decomposing actions, each of which is associated with a subject granularity of the second level. For example, the decomposed actions corresponding to the subjects with second level subject granularity may be identified together with a starting point, a completion point, and the spatial and temporal positions. Taking segment5 as an example, the segment5 corresponds to the subject "magic chair pose" (with a first level subject granularity). The "magic chair pose" contains five continuous actions including "preparation action", "inhalation action1", "exhalation action1", "inhalation action 2", and "restoration action" (each with a second level subject granularity). Hence, the segment5 may be further divided into segment5-1, segment5-2, segment5-3, segment5-4 and segment5-5 corresponding to the five continuous actions, respectively. The granularity level (the second level) for segment5-1 to segment5-5 may be defined as medium granularity. Respective split nodes between adjacent segments of medium granularity may be determined as preparatory segmentation nodes of medium granularity for the video. The preparatory segmentation nodes of medium granularity are marked as gray circles in FIG. 5, such as 5110. For simplicity, the segments of the medium granularity, such as segment5-1 to segment5-5 are not marked in segment5 in FIG. 5.

The segments of medium granularity may be further divided into a plurality of even smaller segments. Taking segment5-1, "preparation action" (associated with a second level subject granularity) as an example, it may be further divided into three decomposed actions (associated with a third level subject granularity): "feet together", "straight upper body", and "arms hanging at the side of the body". The decomposed actions: "feet together", "straight upper body", and "arms hanging at the side of the body" may be identified as segment5-1-1, segment5-1-2, and segment5-1-3, respectively. The subject granularity level associated with the segment5-1-1, segment5-1-2, and segment5-1-3 may be defined as a minimum granularity. Respective split nodes between adjacent segments may be determined as preparatory segmentation nodes of minimum granularity for the video. The preparatory segmentation nodes of minimum granularity are marked as light gray circles in FIG. 5, such as 5111. For simplicity, the segments of the minimum granularity are not marked in the segment 5 in FIG. 5 as well. It should be pointed out that, the segments of the medium granularity and the minimum granularity are not marked out because of the consideration of space, but they actually exist in the FIG. 5.

In this manner, the content of the video may be layered into subjects of three different granularity levels, based on which the content of the video may be divided into multiple segments. Each segment may comprise multiple frames, which express a relatively complete subject that is associated with a certain level of subject granularity. In such way, respective split nodes of adjacent segments associated with respective subject granularities may be determined as the preparatory segmentation nodes. It should be pointed out that the three-level subjects approach discussed is merely an example, other number levels of subjects may be used depending on the detailed implementation.

According to embodiments of the present invention, the video segmentation module 410 may extract all kinds of data from the content of the video to get keywords, concepts, and description information related to subjects or any other classification standard. The segmentation of the multiple segments may adopt any existing technologies, such as shot edge detection technology, action recognition, image classification, and machine learning technologies, and the detailed implementations should not adversely limit the scope of the invention.

According to embodiments of the present invention, the correlation coefficient calculation module 420 may calculate respective correlation coefficients for adjacent segments in the video. A correlation coefficient is a measure of the correlation between two adjacent video segments in time sequence, and the value range of a correlation coefficient is [−1,1]. The greater the absolute value of the correlation coefficient is, the higher the correlation is between the two adjacent video segments.

According to embodiments of the present invention, the correlation coefficient calculation module 420 may further generate respective keywords for the segments in the video based on image analysis, speech to text, concept extraction, keyword extraction, or other technologies. The correlation coefficient calculation module 420 may also extract the time interval, the continuity, the distance, etc. between adjacent segments associated with a subject granularity of the same level as inputs to obtain a keyword sequence. The correlation coefficient calculation module 420 may convert the keyword sequences into a corresponding vector sequence for each segment of the video. This may be realized with some Natural Language Processing technologies or services, such as distributed word representation, word2vec, etc. The dimension of this vector depends on the actual scenarios, and the specific value of each element is determined by training. The correlation coefficient calculation module 420 may calculate the correlation coefficients between corresponding vectors of the keywords. For example, the correlation coefficient between vector A and vector B can be calculated with relational analysis models in machine learning, such as Pearson correlation coefficient formula, to analyze and calculate keywords in adjacent segments. Pearson correlation coefficient formula is shown below:

$$r = \frac{\sum_{i=1}^{n}(A_i - \bar{A})(B_i - \bar{B})}{\sqrt{\sum_{i=1}^{n}(A_i - \bar{A})^2}\sqrt{\sum_{i=1}^{n}(B_i - \bar{B})^2}} = \frac{cov(A, B)}{\sigma_A \sigma_B},$$

wherein "r" represents correlation coefficient, cov(A, B) is the covariance of two vectors, and $\sigma_A$ and $\sigma_B$ are the standard deviation of two vectors.

It should be noted that correlation coefficients may be determined with any other appropriate approaches existing nowadays, the detailed implementation should not adversely limit the scope of the invention.

According to embodiments of the present invention, respective correlation coefficients may be calculated for adjacent segments associated with a subject granularity of the same level, such as the coarse granularity, the medium granularity, and the minimum granularity. There may be some overlap among the preparatory segmentation nodes for subject granularity of different levels, for example, a split node may be a node for the first level subject granularity and, in the meantime, the second level subject granularity. In such situations, only the correlation coefficient for the higher-level subject granularity is calculated. The calculation for lower level subject granularity may be skipped. For example, the node 5100 in FIG. 5 may be a node of both coarse granularity and medium granularity. The correlation coefficient as coarse granularity node will be calculated, and the calculation as medium granularity node will not be made repeatedly.

As illustrated in FIG. 5, the lateral (X) axis represents the video segments in time series, and the vertical (Y) axis represents the correlation coefficient value. The coefficient values of adjacent segments in the video may form a correlation coefficient graph line 501. The circles may represent the preparatory segmentation nodes. The circles may be at troughs of the graph with a relatively lower correlation coefficient value. It may be understood that each segment may comprise a relatively complete subject, and the preparatory segmentation nodes may be with lower correlation coefficient value.

Figure 6:
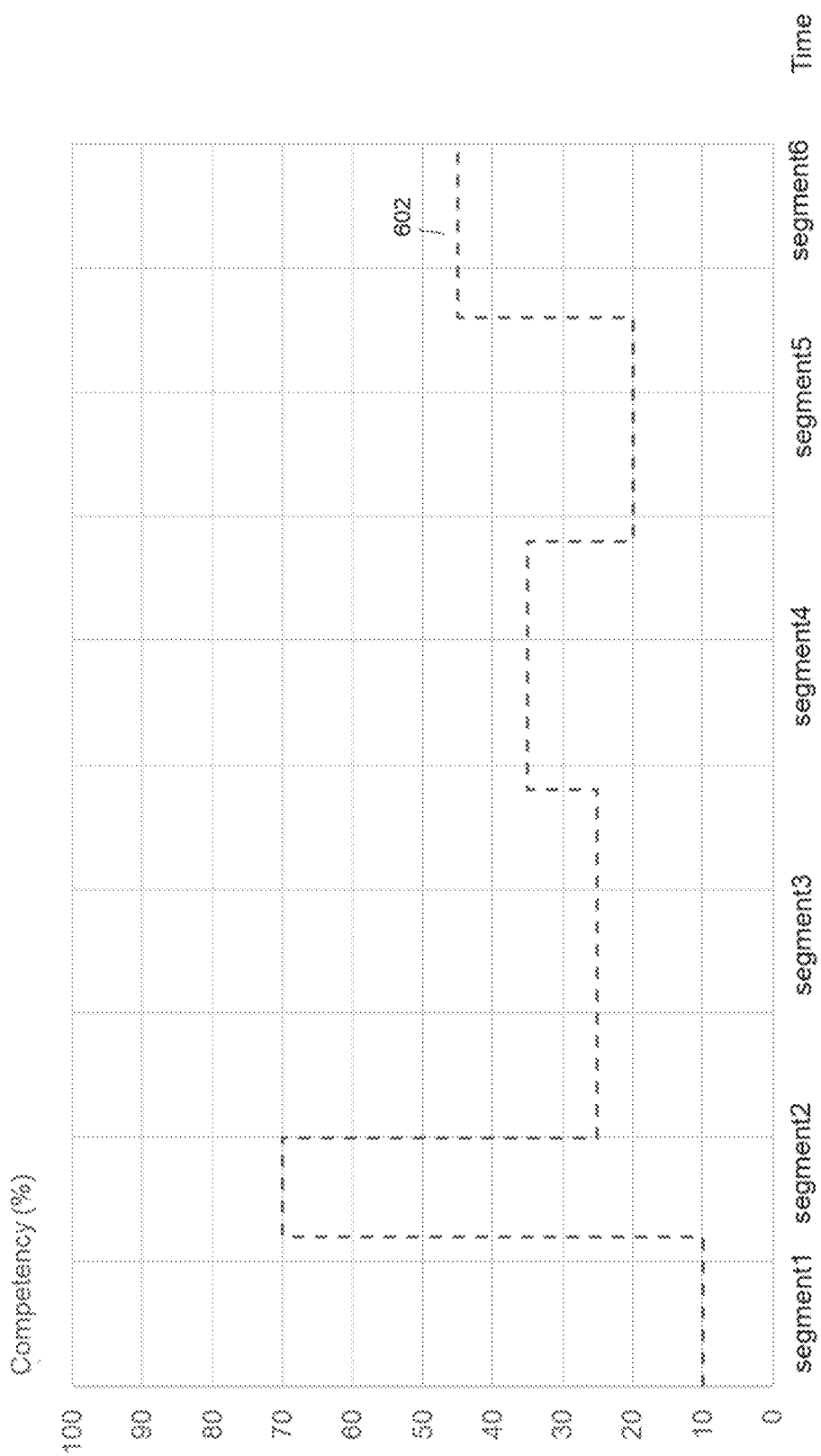
FIG. 6 depicts an example competency values graph according to some embodiments of the present invention.

With reference now to FIG. 6, an example competency graph according to embodiments of the present invention is depicted. According to embodiments of the present invention, the user competency assessment module 430 may establish the competency assessment system for the user in a certain domain, such as cooking, yoga, dancing, music, math, language, and so on. The competency values may be in the range of 0-100%. The user may have the same or different competency value corresponding to different segments in the video. The competency values of a user for the video may form an example competency graph line 602.

The user competency module 430 may obtain the competency values from historical data. The historical data may be updated by tracking the content performed by the user. The user competency module 430 may obtain the competency values by a data analysis process, together with some public attributes of the user, and personalized tags, etc. The competency values may also be a general average value by default if there is no historical data. The competency values may be customized by the user. The manner to obtain the competency value is not limited herein.

As illustrated in FIG. 6, the competency value of the user for segment1 corresponds to 10%, the competency value of the user for segment2 corresponds to 70%, and so on.

Figure 7:
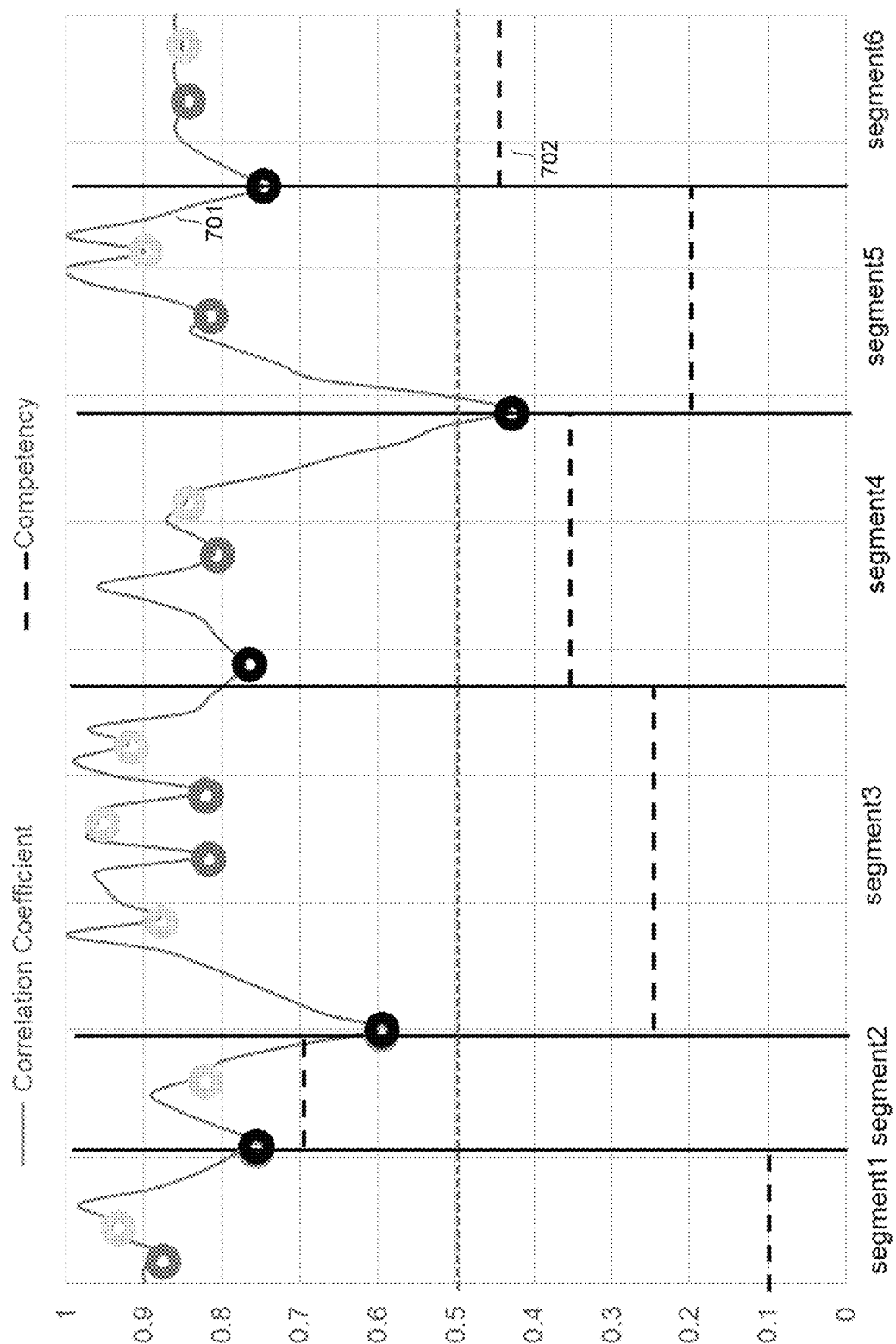
FIG. 7 depicts an example normalized correlation graph and competency graph according to some embodiments of the present invention.

With reference now to FIG. 7, an example of a normalized correlation graph and competency graph according to embodiments of the present invention is depicted. According to embodiments of the present invention, the pausing determination module 440 may use the normalization method to map the eigenvalue of a correlation coefficient and the eigenvalue of a competency value to [0,1], so that the two eigenvalues may be comparable. The normalization formula may be as below:

$$y^* = \frac{y - y_{min}}{y_{max} - y_{min}},$$

wherein y is an original value, $y_{min}$ is the minimum value in all samples, $y_{max}$ is the maximum value in all samples, and y* is the normalized eigenvalue which ranged in [0, 1]. Herein, only values of Y-coordinate are normalized, and values of X-coordinate retain the original values.

For example, the correlation coefficients are: {cc1($x_{cc1}$, 88), cc2($x_{cc2}$, 94.2), cc3($x_{cc3}$, 76), . . . , ccn($x_{ccn}$, $y_{ccn}$)}, among which $y_{cc(max)}$=100, $y_{cc(min)}$=43, wherein ccn represents the correlation coefficient between segment n−1 and segment n, $x_{ccn}$ represents X-coordinate of the correlation coefficient between segment n−1 and segment n, and $y_{ccn}$ represents Y-coordinate of the correlation coefficient between segment n−1 and segment n.

For example, the competency values are: {cp1($x_{cp1}$, 25), cp2($x_{cp2}$, 36), cp3($x_{cp3}$, 42), . . . , cpn($x_{cpn}$, $y_{cpn}$)}, among which $y_{cp(max)}$=70, $y_{cp(min)}$=10, wherein cpn represents the competency value of the user for segment n, $x_{cpn}$ represents X-coordinate of the competency value of the user for segment n, and $y_{cpn}$ represents Y-coordinate of the competency value of the user for segment n.

Thus, the correlation coefficients are transformed as:

$$\left\{(x_{cc1}, 0.789), (x_{cc2}, 0.898), (x_{cc3}, 0.579), \ldots, \left(x_{ccn}, \frac{y_{ccn} - y_{cc(min)}}{y_{cc(max)} - y_{cc(min)}}\right)\right\},$$

and the competency values are transformed as:

$$\left\{(x_{cp1}, 0.25), (x_{cp2}, 0.43), (x_{cp3}, 0.53), \ldots, \left(x_{cpn}, \frac{y_{cpn} - y_{cp(min)}}{y_{cp(max)} - y_{cp(min)}}\right)\right\},$$

As illustrated in FIG. 7, after normalization, the correlation graph and the competency graph may be shown in the same coordinate system with the correlation graph line 701 and competency graph line 702 shown.

Figure 8:
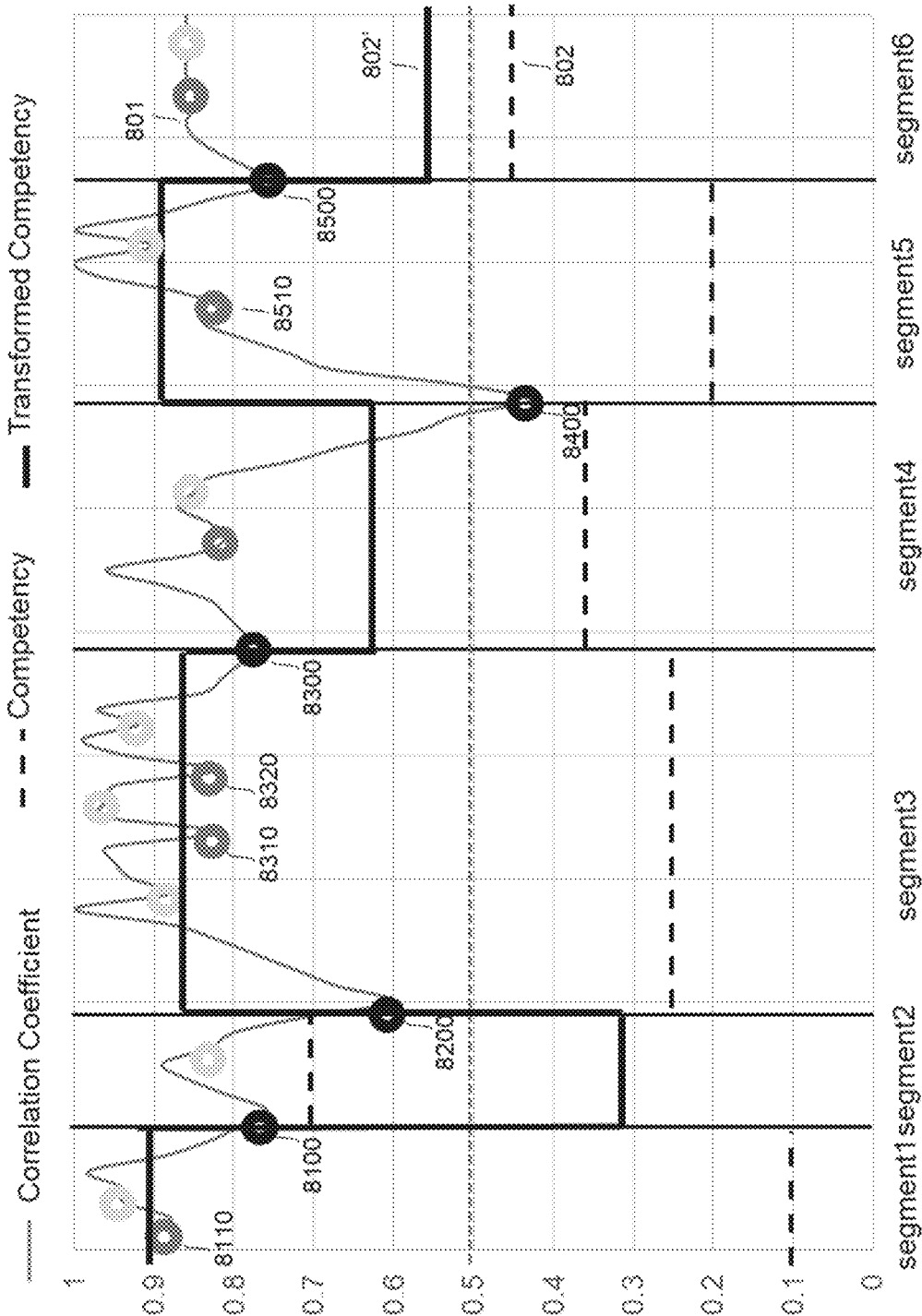
FIG. 8 depicts an example of determining pausing nodes according to embodiments of the present invention.

With reference now to FIG. 8, an example of determining pausing nodes according to embodiments of the present invention is depicted. According to embodiments of the present invention, the pausing determination module 440 may inversely transform the normalized competency graph based on its center line and a weight, using the equation: $Y_{cp'(j)} = (y_{cp'(max)} - y_{cp'(i)}) * w$, wherein $y_{cp'(j)}$ represents the competency value after transformation, $y_{cp'(max)}$ represents the maximum value of Y-coordinate, and $y_{cp'(i)}$ represents original competency value before transformation, and wherein w is the weight for cross-coupling, which may be simply set as 1 such that the original competency graph and the transformed competency graph would be symmetrical to its center line, or be selected such that the normalized competency graph may best fit the normalized correlation graph, as seen by graph line 801. The weight may be manually set as another constant value based on experience or requirement for transformation. According to some embodiments of the present invention, the weight may be greater than zero.

In the example of FIG. 8, the weight is set as 1. As illustrated, the center line corresponds to the value 0.5 of vertical axis. Graph line 802 may refer to the competency graph before transformation. Graph line 802' may refer to the transformed competency graph, which is symmetrical with graph line 802.

According to embodiments of the present invention, after the transformation, the pausing determination module 440 may determine one or more nodes with inverse transformed competency value greater than corresponding correlation coefficient (the inverse transformed competency graph is above the corresponding correlation graph) from the preparatory segmentation nodes as the pausing nodes. For example, as illustrated in FIG. 8, nodes 8110, 8100, 8200, 8310, 8320, 8300, 8400, 8510, and 8500 may be determined as the pausing nodes, in which nodes 8110 and 8100 are below the heavy black line with value 0.9, and similarly for other determined nodes. It can be understood that the higher the competency value is, the coarser the granularity of the determined pausing node is. There is no pausing node if the competency value is high. Similarly, the lower the competency value is, the finer the granularity of the determined pausing node is. For example, the competency value of the user for segment1 is relatively lower, so not only the coarse granularity node 8100, but also the medium granularity node 8110 are determined as pausing nodes. The competency value of the user for segment2 is relatively higher, so no pausing node is determined for it.

According to embodiments of the present invention, the user may continue the playback by clicking the playback button manually after the pause. According to embodiments of the present invention, the video playback may continue automatically after the pause or with a replay of one or more segments in the video. The length of the pause or the replay and other functions can be preset or selected by the user and should not adversely limit the scope of the invention.

Figure 9:
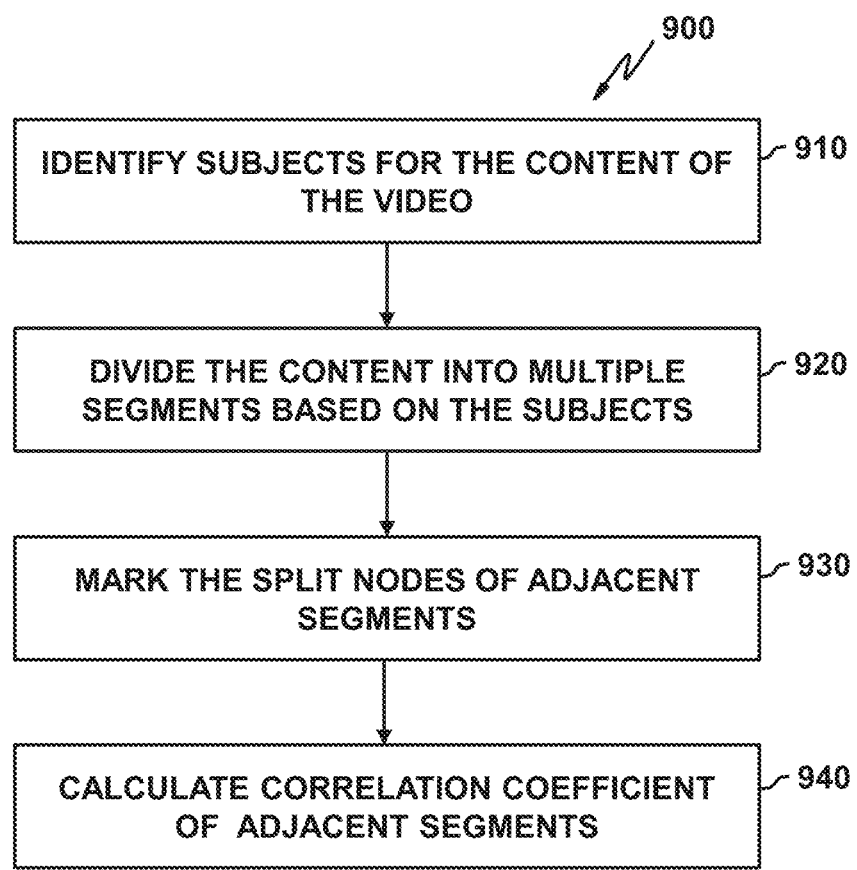
FIG. 9 depicts an example flow chart of a method for determining split nodes and correlation of adjacent segments based on content of a video according to embodiments of the present invention.

With reference now to FIG. 9, an example flow chart of method 900 for determining respective split nodes and a correlation of adjacent segments based on content of a video according to embodiments of the present invention is depicted. The method 900 may comprise operations 910-940. Operations 910-940 may be implemented by the video segmentation module 410 shown in FIG. 4. Operations 910-940 may be the preprocessing operations for the content of the video.

At operation 910, the video segmentation module 410 may identify a plurality of subjects for the content of the video, each subject being associated with a level of subject granularity. At operation 920, the video segmentation module 410 may divide the content of the video into a corresponding plurality of segments based on the plurality of subjects. At operation 930, the video segmentation module 410 may mark respective split nodes of adjacent segments associated with a subject granularity of the same level. At operation 940, the video segments module 410 may calculate respective correlation coefficients of adjacent segments associated with the subject granularity of the same level.

Figure 10:
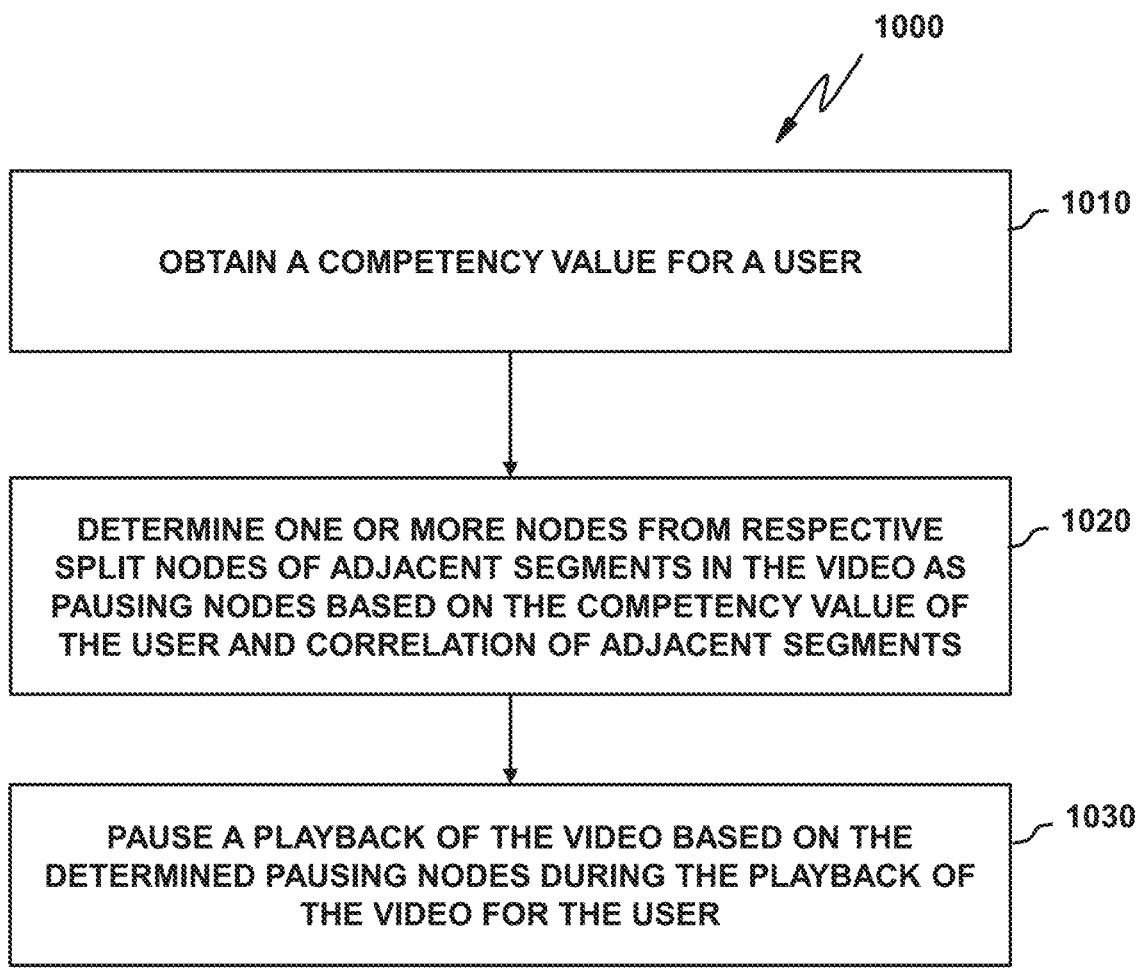
FIG. 10 depicts an example flow chart of a method for determining one or more pausing nodes of the video for the user according to embodiments of the present invention.

With reference now to FIG. 10, an example flow chart of method 1000 for determining one or more pausing nodes for a video according to embodiments of the present invention is depicted. The method 1000 may comprise operations 1010-1030. Operations 1010-1030 may be implemented by the video playback control module 400 shown in FIG. 4.

At operation 1010, in response to receiving a request to play a video from a user, the pausing determination module 440 may obtain corresponding competency values for the user from the user competency module 430, wherein the competency values indicate a competency assessment of the user imitating a content of the video.

In some embodiments, at operation 1010, the pausing determination module 440 may obtain the competency values from a competency value historical data, a data analysis process, or a default set for the user, or customized by the use.

At operation 1020, the pausing determination module 440 may determine one or more nodes from respective split nodes of adjacent segments in the video as pausing nodes based on the competency values of the user and correlation of the adjacent segments in the video, the split nodes and the correlation of adjacent segments determined based on the content of the video. The split nodes and the correlation of adjacent segments may be determined based on the content of the video, as shown in FIG. 9.

In some embodiments, at operation 1020, the pausing determination module 440 may normalize the competency values and the correlation coefficients, generate, in a same coordinate system, a competency graph based on the normalized competency values and a correlation graph based on the normalized correlation coefficients, and inversely transforming the competency graph based on a center line and a weight for cross-coupling with the correlation graph. In some embodiments, the weight may be set as a number greater than 0. In some embodiments, the weight may be set as 1.

At operation 1030, the pausing module 400 may pause a playback of the video based on the determined pausing nodes during the playback of the video for the user.

In some embodiments, the tracking competency module 450 may receive the content performed by the user, calculate updated competency values associated with the content for the user based on the received content and the content of the video, and update corresponding competency values for the user with the updated competency values.

It should be noted that the processing of pausing playing a video according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But, the various embodiments can be practiced without these specific details. In other instances, well-known circuits, structures, and techniques have not been shown in detail in order not to obscure embodiments.

What is claimed is:

1. A computer-implemented method comprising:
in response to receiving a request to play a video from a user, obtaining corresponding competency values for the user, wherein each competency value indicate a competency assessment of the user imitating a content of the video;
determining one or more nodes from respective split nodes of adjacent segments in the video as pausing nodes based on the corresponding competency values and a correlation of the adjacent segments, wherein the split nodes and the correlation of the adjacent segments are determined based on the content of the video; and
pausing a playback of the video based on the pausing nodes during the playback of the video for the user.

2. The computer-implemented method of claim 1, wherein the split nodes and the correlation of the adjacent segments are determined by:
identifying a plurality of subjects for the content of the video, each subject being associated with a level of subject granularity;
dividing the video into corresponding segments based on the plurality of subjects;
marking respective split nodes of respective adjacent segments associated with a subject granularity of a same level; and
calculating respective correlation coefficients of respective adjacent segments associated with the subject granularity of the same level.

3. The computer-implemented method of claim 2, wherein determining the one or more nodes from respective split nodes of the adjacent segments in the video as the pausing nodes comprises:
normalizing the competency values and the correlation coefficients;
generating, in a same coordinate system, a competency graph based on the normalized competency values and a correlation graph based on the normalized correlation coefficients; and
inversely transforming the competency graph based on a center line and a weight for cross-coupling with the correlation graph.

4. The computer-implemented method of claim 3, wherein the weight is set as a number greater than 0.

5. The computer-implemented method of claim 3, wherein the weight is set as 1.

6. The computer-implemented method of claim 1, further comprising:
receiving the content performed by the user;
calculating updated competency values associated with the content of the video for the user based on the content performed by the user and general content of the video; and
updating corresponding competency values for the user with the updated competency values.

7. The computer-implemented method of claim 1, wherein the competency values are obtained from a competency value historical data, a data analysis process, a default set for the user, or are customized by the user.

8. A computer system comprising:
at least one processing unit; and
a memory coupled to the at least one processing unit and stored instructions thereon, the instructions, when executed by the at least one processing unit, performing actions comprising:
in response to receiving a request to play a video from a user, obtaining corresponding competency values for the user, wherein each competency value indicate a competency assessment of the user imitating a content of the video;
determining one or more nodes from respective split nodes of adjacent segments in the video as pausing nodes based on the corresponding competency values and a correlation of the adjacent segments, wherein the split nodes and the correlation of the adjacent segments are determined based on the content of the video; and
pausing a playback of the video based on the pausing nodes during the playback of the video for the user.

9. The computer system of claim 8, wherein the split nodes and the correlation of the adjacent segments are determined by:
identifying a plurality of subjects for the content of the video, each subject being associated with a level of subject granularity;
dividing the video into corresponding segments based on the plurality of subjects;
marking respective split nodes of respective adjacent segments associated with a subject granularity of a same level; and
calculating respective correlation coefficients of respective adjacent segments associated with the subject granularity of the same level.

10. The computer system of claim 9, wherein determining the one or more nodes from respective split nodes of the adjacent segments in the video as the pausing nodes comprises:
normalizing the competency values and the correlation coefficients;
generating, in a same coordinate system, a competency graph based on the normalized competency values and a correlation graph based on the normalized correlation coefficients; and
inversely transforming the competency graph based on a center line and a weight for cross-coupling with the correlation graph.

11. The computer system of claim 10, wherein the weight is set as a number greater than 0.

12. The computer system of claim 10, wherein the weight is set as 1.

13. The computer system of claim 8, wherein the instructions performing actions further comprises:
receiving the content performed by the user;
calculating updated competency values associated with the content for the user based on the content performed by the user and general content of the video; and updating corresponding competency values for the user with the updated competency values.

14. The computer system of claim 8, wherein the competency values are obtained from a competency value historical data, a data analysis process, a default set for the user, or are customized by the user.

15. A computer program product comprising:
one or more computer readable storage mediums having program instructions embodied therewith, the program instructions executable by an electronic device to cause the electronic device to perform actions comprising:
in response to receiving a request to play a video from a user, obtaining corresponding competency values for the user, wherein each competency values indicate a competency assessment of the user imitating a content of the video;
determining one or more nodes from respective split nodes of adjacent segments in the video as pausing nodes based on the corresponding competency values and a correlation of the adjacent segments, wherein the split nodes and the correlation of the adjacent segments are determined based on the content of the video; and
pausing a playback of the video based on the pausing nodes during the playback of the video for the user.

16. The computer program product of claim 15, wherein the split nodes and the correlation of the adjacent segments are determined by:
identifying a plurality of subjects for the content of the video, each subject being associated with a level of subject granularity;
dividing the video into corresponding segments based on the plurality of subjects;
marking respective split nodes of respective adjacent segments associated with a subject granularity of a same level; and
calculating respective correlation coefficients of respective adjacent segments associated with the subject granularity of the same level.

17. The computer program product of claim 16, wherein determining the one or more nodes from respective split nodes of the adjacent segments in the video as the pausing nodes comprises:
normalizing the competency values and the correlation coefficients;
generating, in a same coordinate system, a competency graph based on the normalized competency values and a correlation graph based on the normalized correlation coefficients; and
inversely transforming the competency graph based on a center line and a weight for cross-coupling with the correlation graph.

18. The computer program product of claim 17, wherein the weight is set as a number greater than 0.

19. The computer program product of claim 17, wherein the weight is set as 1.

20. The computer program product of claim 15, the program instructions performing actions further comprises:
receiving the content performed by the user;
calculating updated competency values associated with the content for the user based on the content performed by the user and the content of the video; and
updating corresponding competency values for the user with the updated competency values.

\* \* \* \* \*